United States Patent [19]

Rutherford

[11] 4,439,971
[45] Apr. 3, 1984

[54] PANEL CONNECTOR

[75] Inventor: John S. Rutherford, Chalfont, Pa.

[73] Assignee: Woodrite, Inc., Willow Grove, Pa.

[21] Appl. No.: 361,345

[22] Filed: Mar. 24, 1982

[51] Int. Cl.³ .............................................. E04C 1/10
[52] U.S. Cl. ..................................... 52/584; 292/194; 312/263; 403/321
[58] Field of Search ............... 52/584, 582, 36, 583; 292/241, 202, 204, 194; 312/111, 140, 263; 403/6, 321, 322

[56] References Cited

U.S. PATENT DOCUMENTS

| | | | |
|---|---|---|---|
| 2,581,816 | 1/1952 | Schlueter | 292/204 |
| 3,159,440 | 12/1964 | Courtwright | 312/263 |
| 3,339,954 | 9/1967 | Alvden | 403/322 |
| 3,410,584 | 11/1968 | Bus | 52/584 X |
| 3,469,347 | 9/1969 | Ringle | 292/202 |
| 3,589,755 | 6/1971 | King | 52/584 |
| 3,993,377 | 11/1976 | Montroy | 312/263 |
| 4,020,613 | 5/1977 | Reynolds et al. | 52/584 |
| 4,070,848 | 1/1978 | Lingle | 52/584 |
| 4,165,908 | 8/1979 | Cooper et al. | 312/111 |
| 4,178,047 | 12/1979 | Welch | 52/36 |

FOREIGN PATENT DOCUMENTS

| | | | |
|---|---|---|---|
| 9260 | of 1898 | United Kingdom | 292/194 |
| 916596 | 1/1963 | United Kingdom | 312/263 |
| 2080901 | 2/1982 | United Kingdom | 403/321 |

Primary Examiner—J. Karl Bell
Attorney, Agent, or Firm—Stanley Bilker

[57] ABSTRACT

A concealed connector for detachably coupling two panels together comprises a keeper entirely recessed within an edge of one panel and a rotatable latch outwardly projecting from a surface of the other panel. The latch includes a cam portion in the form of a partial thread which is inserted within the keeper recess for engagement with a flanged lip on the keeper. A stylus key is passed through a narrow access slot in communication with the recess and is selectively received within circumferentially spaced holes in the latch periphery. Turning of the latch in one direction by the key draws the abutting edges of the panels together in locked disposition while turning the latch in the other direction effects release.

13 Claims, 8 Drawing Figures

PANEL CONNECTOR

BACKGROUND OF THE INVENTION

1. Field of the Invention

This invention relates to connectors for coupling panel sections together in locked disposition with each other. More particularly, this invention relates to fastening connectors for assembling generally flat panel members, such as wall systems, room dividers, partitions, table and desk tops, modular cabinets, shelves, and the like in end-to-end or edge-to-surface configuration whereby said connectors are fully concealed when adjacent components are clamped together but which are accessible for release should it be desirable to disassemble the units.

2. Prior Art

In the modular furniture and wall system industry, especially made-to-order expensive constructions, it is desirable and necessary to couple adjacent panel sections together in abutment with each other in various configurations with the least amount of connecting hardware being visible.

One such fastener utilized in the past employed a toggle or draw bolt which was inserted in aligned bores of adjacent panel sections. Sleeve or crescent nuts were then inserted within enlarged holes within the surfaces of adjacent panels proximate the edges and threaded upon the ends of the toggle bolts to draw the panes together. Examples of such fasteners are shown in U.S. Pat. No. 2,747,638 or U.S. Pat. No. 2,815,997. While fasteners of the toggle bolt type provided even and controlled pressure between the joined panel members, it was necessary to plug or cap the enlarged holes after assembly in order to conceal the nuts. Furthermore, the plugs or caps often detracted from the esthetic design appearance when an unblemished surface contour was desired.

Other concealed edge-to-edge fasteners used for this purpose presented substantial alignment problems in order to effect registration of the interlocking latch elements. Moreover, if and when disassembly were required at a later date, it became all but impossible to detach the members without marring the expensive finished surfaces of the panel sections. Connectors of this type are shown in U.S. Pat. No. 3,064,321.

Still other coupling systems for cojoining the dges of adjacent penels employed longitudinally slidable interlocks in the edges of adjacent panels. Of course, the inherent disadvantage of these sliding systems resided in the difficulty of jockeying relatively heavy panels lengthwise with respect to each other. In addition, since the use of longitudinally slidable connectors required offsetting of one panel with respect to the other during both assembly as well as disassembly, space limitations, such as room size, frequently precluded this type of slidable joint from being considered.

SUMMARY OF THE INVENTION

It is therefore an object of this invention to provide a connector for detachably coupling panel sections together in end-to-end or edge-to-surface disposition such that the connector is concealed and remains invisible after assembly.

Another object of this invention is to provide a connector in which coupling of panel sections is accomplished with facility.

Still another object of this invention is to provide a connector system for assembling panel sections wherein the components may be drawn together with uniform pressure and without undue strain.

Yet another object of this invention is to provide a panel connector employing keeper and latch members wherein alignment of these members is readily accomplished with minimal effort.

Yet still a further object of this invention is to provide a key-actuated, cam operated panel connector for use with expensive made-to-order modular constructions.

Other objects of this invention are to provide an improved device of the character described which is easily and economically produced, that is sturdy in construction and which is both highly efficient and effective in operation.

The foregoing objects are accomplished by a panel connector having a keeper entirely recessed within the edge of one panel and a rotatable latch outwardly projecting from either the edge or major surface of the other panel. The latch includes a cam portion in the form of a partial thread or helical slot contoured within a cylindrical surface thereof. When the latch is inserted within the recess, the thread or helical slot is adapted to receive a flanged lip on the keeper. An elongate key in the shape of a stylus is passed through a narrow access slot in communication with the recess in the edge of the panel retaining the keeper and is adapted to engage one of a number of circumferentially spaced holes in the latch periphery. Turning the latch by means of the stylus key in one direction causes the threaded cam to draw up on the keeper and pull the abutting edges of the panels together in interlocked disposition wherein the connector is invisibly concealed therebetween. Turning the key in the other direction unlocks the connector.

DESCRIPTION OF THE DRAWINGS

With the above and related objects in view, this invention consists of the details of construction and combination of parts as will be more fully understood from the following detailed description when read in conjunction with the accompanying drawings in which.

DETAILED DESCRIPTION

Figure 1:
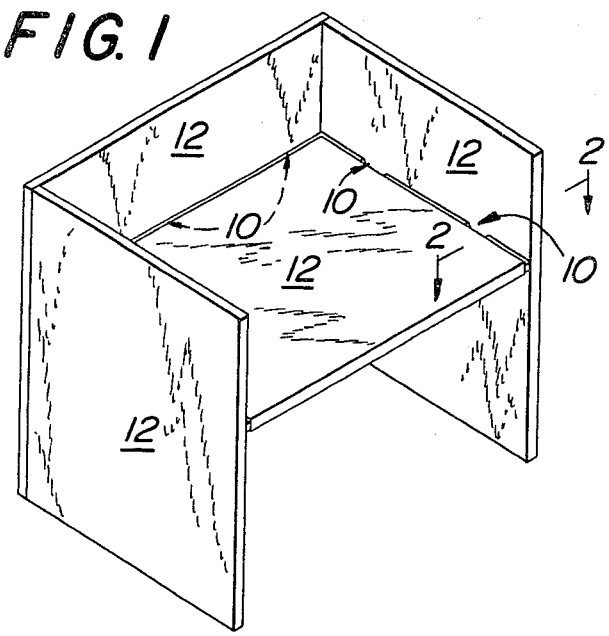
FIG. 1 is a perspective view of a modular unit assembled with the use of a panel connector embodying this invention.

Referring now in greater detail to the drawings in which similar reference characters refer to similar parts, there is shown a panel connector 10 of the present invention which is utilized for detachably coupling two panel sections 12 together in end-to-end (FIG. 7) or in edge-to-major surface (FIG. 1) abutting and locked disposition.

Figure 7:
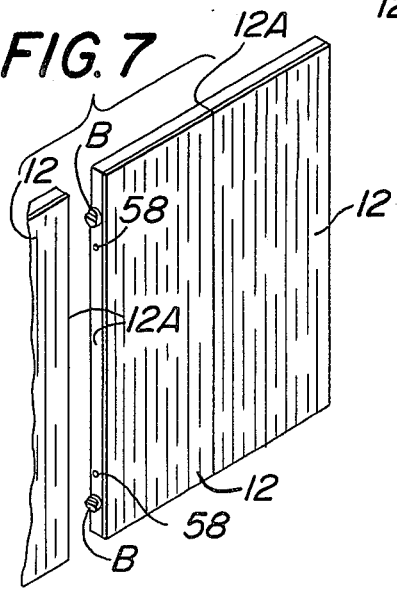
FIG. 7 is a partially exploded view of the panel sections and showing the connector therebetween.

The connector 10 comprises a keeper member A which is recessed within an edge 12A of one panel 12 and a rotatable latch member B which outwardly projects from a major surface 12B of one panel 12, as shown in FIG. 1, or from an edge 12A of the panel 12, as shown in FIG. 7. Both the keeper A and the latch B are made of a suitable metal, such as stainless steel, that is adapted to bear the stress of interlocking engagement.

The panels 12 for which the present invention is intended are generally large flat sections of plywood, chipboard or flakeboard that are to be assembled as wall systems, room partitions, or modular units, including table and desk tops, shelves, cabinets or the like. These panels 12 may incorporate an outer finish, such as a paint, coating or decorative bonded laminate, or may be overlaid with an exterior acoustical material to deaden sound.

The keeper member A may be of L-shaped or channel configuration and may be suitably cast or bent into such shape. The keeper A comprises a flange or lip 14 which is adapted to be engaged by the latch B, a base portion 16, and an intermediate bight portion 18 which bridges the flanged lip 14 and the base portion 16. The base 16 is secured to the bottom of recess 20 by means of screws 22 passing through holes 24 and then threaded into the body of panel 12. A stop 26 at the opposite end of the base 16 serves as a guide for the latch B and further to lend stregth to the keeper A as a stiffener. The recess 20 is formed by means of a shaper or other suitable tool such that the bottom of said recess is substantially parallel to the surface in which it is formed. The depth of the recess 20 is such that the lip 14 of keeper A extends across a portion of the recess parallel to its bottom and below the exterior surface of edge 12A. A narrow slot or channel 28 is formed at the surface of edge 12A and extends from the major surface of the panel 12 holding the keeper into communication with the recess 20. The channel 28 acts as an access slot to permit insertion of the stylus key C to actuate latch B as will be more fully described hereinafter. It is preferable, however, that the key access slot 28 be cut into a thin reveal strip 30 which is secured to edge 12A of the keeper panel by means of suitable screws 32. The reveal 30 may be any suitable thin plastic laminate that provides a decorative finish to the panel edge 12A, and, when viewed after assembly, appears as a design stripe. The size and outline of the recess 20 is immaterial so long as it is large enough to accommodate the keeper A.

Figure 2:
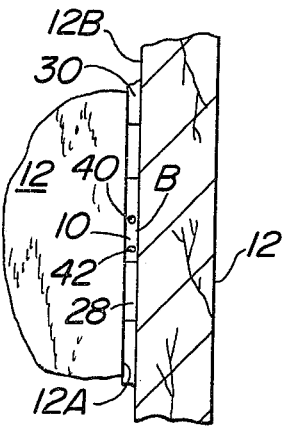
FIG. 2 is a sectional view taken along lines 2—2 of FIG. 1.
Figure 3:
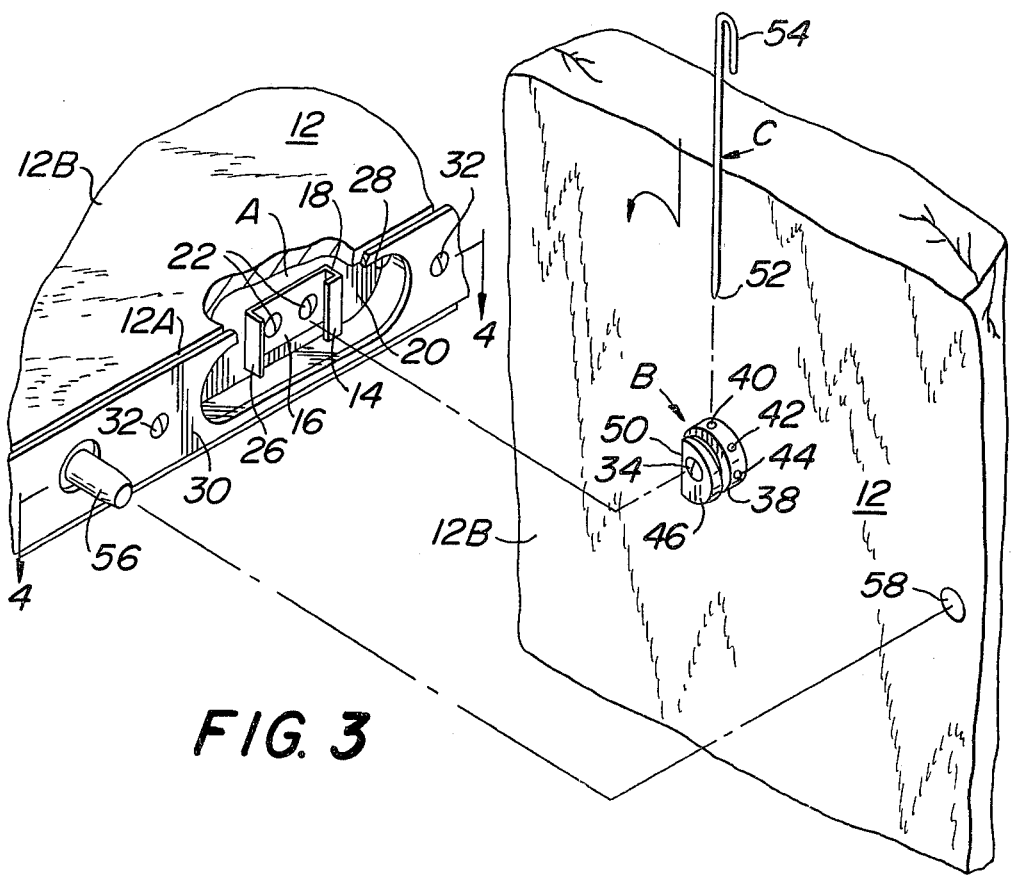
FIG. 3 is an exploded perspective view of the panel connector showing details of the latch and keeper members of the present invention.
Figure 4:
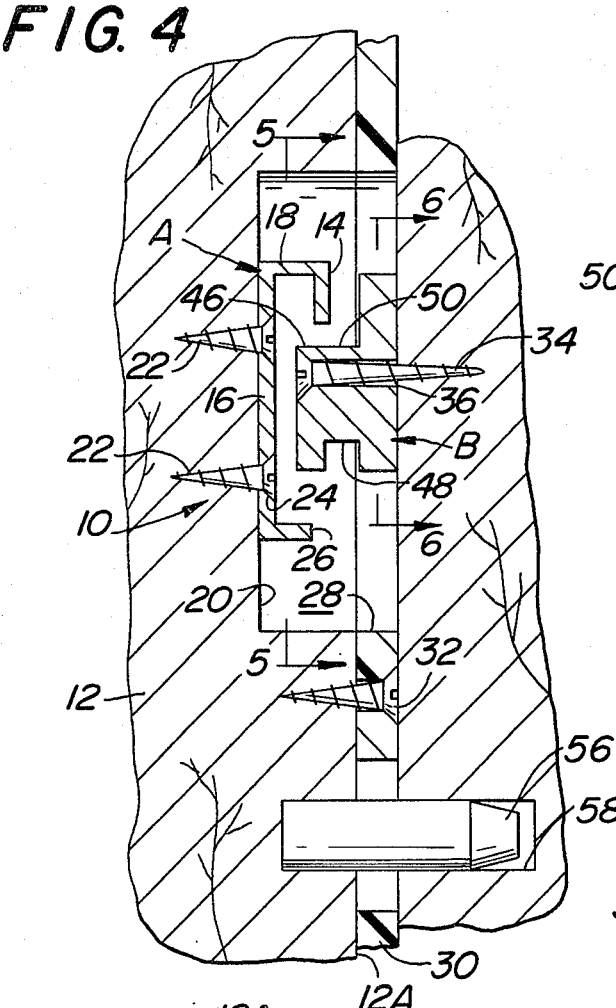
FIG. 4 is an assembled sectional view taken along lines 4—4 of FIG. 3.
Figure 5:
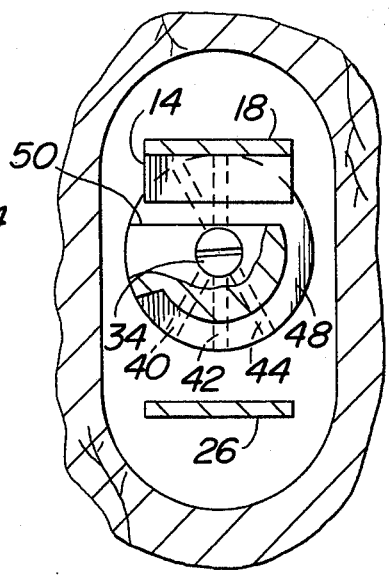
FIG. 5 is a sectional view taken along lines 5—5 of FIG. 4.
Figure 6:
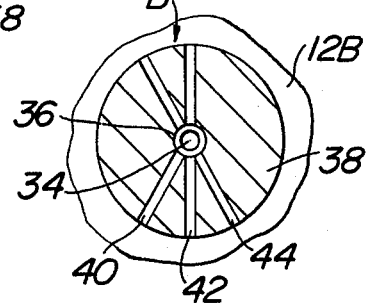
FIG. 6 is a sectional view taken along lines 6—6 of FIG. 4.

The latch B is substantially cylindrical in cross section and is rotatably supported on a lag or shoulder screw 34 passing through an axial bore 36 therein and threaded into the major surface 12B of panel 12, as shown in FIGS. 2, 3 and 4, or into the edge 12A of the panel, as shown in FIG. 7, depending upon the nature of the panel coupling. The latch B includes a hub portion 38 having two or three circumferentially spaced holes 40, 42, 44 within its periphery which are adapted to be selectively engaged by the stylus key C in order to rotate said latch. Outwardly projecting from the hub 38 is a cam portion 46 which includes an external thread or helical groove 48 whose extent is slightly greater than 90° of arc. The helical groove 48 is of sufficient width and pitch as to receive the flanged lip of keeper A. The end of cam portion 46 has a flat 50 which acts as a relief to enable the end of latch B to pass under the flanged lip 14 when inserted into the recess 20 preparatory to engagement of the keeper flanged lip within the helical groove 48.

The key C is a thin elongate member in the general shape of a stylus which may freely pass through the access channel 28. The key C includes a point 52 which is adapted to be selectively received within one of the peripheral holes 40, 42, 44 of the latch B. A handle 54 of stylus key C enables the latch B to be rotated through approximately 90° from outside the access channel whereby engagement of the helically slotted cam 46 with flanged lip 14 of keeper A draws the adjacent surfaces of the panels 12 into interlocked tight abutment. Correspondingly, rotation of the cam latch B by stylus key C in the opposite direction after it has been locked releases the flanged lip 14 from the helical groove 48 to detach the latch B from the keeper thereby releasing the previously joined panels.

In order to facilitate alignment of the latch B with keeper A, dowels 56 pressed within and projecting from the edge 12A are adapted to register with complementary bores 58 in the surface 12A or B of the second panel 12. It has been found that an appropriate spacing for the dowels 56 and bores 58 may be every two to three lineal feet. FIGS. 1 through 6 demonstrate the edge-to-major surface abutment of two panel sections 12 while FIG. 7 depicts an end-to-end abutment of two panels. The procedure for locking two panels 12 together contemplates inserting one stylus key C into the index hole 40 of each latch B. Then, with the flats 50 arranged parallel to the flanged lip 14 of keeper A, the two panels are pressed together so that the dowels 56 interfit within registration holes 58. Next, with each stylus key C extending through a coresppnding access slot 28, the latches B are inserted into the recesses 20 under the keepers A. The stylus key now in hole 40 is rotated by its handle 54 until the body of the stylus key abuts the edge of the slot 28. The key C is then removed from hole 40 and inserted into hole 42 or 44 if necessary and again rotated in one direction until the action of the helical groove 48 on flanged lip 14 draws the two panels 12 into locked engagement with each other, after which the keys C are removed. To unlock the panels 12 when desired, the keys are inserted into holes 44 and rotated in the opposite direction until the cam groove 48 releases the flanged lip 14.

Figure 8:
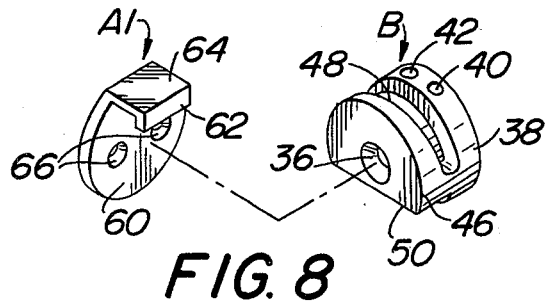
FIG. 8 is an exploded perspective view showing another embodiment of this invention.

In FIG. 8, there is shown a modified form of the instant invention wherein a circular keeper A1 is substituted for the rectangular keeper A. The circularly configured keeper would be mounted within a circular hole which could be cut with a drill rather than a shaper. The keeper A1 employs a circular base 60 having a flange 62 connected thereto by a bight portion 64. Holes 66 allows keeper A1 to be secured to the bottom of its recess by suitable screws.

Although this invention has been described in considerable detail, such description is intended as being illustrative rather than limiting, since the invention may be variously embodied without departing from the spirit thereof, and the scope of the invention is to be determined as claimed.

What is claimed is:

1. A concealed connector for coupling two panel sections together comprising a first member mounted within a recess within an edge of one panel section and including a lip extending partially into the recess, and a second member outwardly projecting from a surface of the second panel section and being rotatably coupled with respect thereto on an axis substantially normal to the surface thereof, said second member including an externally threaded cam portion adapted to protrude within the recess of the first panel section when the two panel sections are abutted, and means for rotating said second member at the periphery thereof adjacent the surface of the second panel section so that a segment of said threaded cam portion will engage said lip and draw the abutting surfaces of the two panel sections in tight locked disposition with the connector retained invisibly therebetween.

2. The connector of claim 1 wherein said first member constitutes a keeper of substantially rectangular configuration.

3. The connector of claim 1 wherein said first member constitutes a keeper of substantially circular configuration.

4. The connector of claim 1 wherein said first member comprises a keeper including a base portion secured to the bottom of the recess, and a bight portion connecting the lip to the base portion in parallel disposition to the edge of said panel and spaced below the surface of said edge.

5. The connector of claim 1 wherein said second member constitutes a latch of substantially cylindrical disposition, the cam portion of said latch including a flattened zone defining a relief in a first rotatable position to enable the latch to enter the recess without interfering with the lip of said first member.

6. The connector of claim 5 wherein the cylindrical portion of said latch includes a partial helical groove to receive the lip of said first member.

7. The connector of claim 6 wherein said latch further includes a hub from which the cam portion projects.

8. The connector of claim 7 wherein the hub includes circumferentially spaced means on the peripheral wall thereof for complementary engagement with the means for rotating said second member.

9. The connector of claim 8 wherein the means for rotating said second member comprises an elongate pointed key of needlelike configuration interfitting with circumferentially spaced holes constituting said circumferentially spaced means.

10. The connector of claim 9 wherein a thin strip constituting a reveal is secured to the edge of the panel section containing the recess for said first member, said reveal including an access slot communicating with the recess and permitting passage therethrough of said elongate key.

11. A concealed connector for coupling two panel sections together comprising a lipped keeper mounted within a recess of one panel section, and a latch outwardly projecting from and rotatably journaled on the surface of the second panel section, said latch including a hub portion proximal to the second panel surface and a cam portion at the distal end adapted to project within the recess when the two panel sections are abutted, said cam portion including an inclined segment of partial helical configuration, said hub portion including circumferentially spaced keyways at the periphery thereof immediately adjacent the second panel surface, and an elongate key for selectively interfitting within the circumferentially spaced keyways for turning the latch through a predetermined arc so that the inclined segment of the cam portion will engage the lipped keeper and draw abutting surfaces of the two panel sections together in tight locked disposition with the connector retained invisibly therebetween.

12. The connector of claim 11 wherein the hub keyways comprises holes of small diameter and the elongate key is pointed.

13. The connector of claim 12 wherein a thin strip constituting a reveal is secured to the edge of the first panel section, said reveal including an access slot adjacent to and communicating with the keeper recess to permit passage therethrough of said pointed eleongate key.

* * * * *